US007453856B2

(12) United States Patent
Guey

(10) Patent No.: US 7,453,856 B2
(45) Date of Patent: Nov. 18, 2008

(54) METHOD, APPARATUS, AND COMMUNICATIONS INTERFACE FOR SENDING AND RECEIVING DATA BLOCKS ASSOCIATED WITH DIFFERENT MULTIPLE ACCESS TECHNIQUES

(75) Inventor: Jiann-Ching Guey, Cary, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 778 days.

(21) Appl. No.: 10/933,503

(22) Filed: Sep. 3, 2004

(65) Prior Publication Data

US 2006/0050664 A1 Mar. 9, 2006

(51) Int. Cl.
*H04J 3/00* (2006.01)
*H04J 1/00* (2006.01)
*H04B 7/216* (2006.01)
*H04Q 7/24* (2006.01)

(52) U.S. Cl. .................. 370/336; 370/335; 370/338; 370/342; 370/343

(58) Field of Classification Search ................ 370/229, 370/431, 464, 335, 338, 342; 455/3.01, 418, 455/446
See application file for complete search history.

(56) References Cited

U.S. PATENT DOCUMENTS

| | | | | |
|---|---|---|---|---|
| 5,537,435 | A * | 7/1996 | Carney et al. ............... | 375/219 |
| 5,790,516 | A | 8/1998 | Gudmundson | |
| 5,805,581 | A * | 9/1998 | Uchida et al. .............. | 370/335 |
| 6,005,893 | A | 12/1999 | Hyll | |
| 6,256,508 | B1 * | 7/2001 | Nakagawa et al. .......... | 370/312 |
| 6,282,184 | B1 * | 8/2001 | Lehman et al. ............. | 370/342 |
| 6,587,448 | B1 * | 7/2003 | Dajer et al. ................ | 370/335 |
| 6,781,975 | B1 | 8/2004 | Baier et al. | |
| 6,920,118 | B2 * | 7/2005 | Lozano ...................... | 370/329 |
| 6,928,047 | B1 * | 8/2005 | Xia ........................... | 370/206 |
| 6,967,999 | B2 * | 11/2005 | Subramanian et al. ...... | 375/224 |
| 7,085,307 | B2 * | 8/2006 | Hudson ..................... | 375/140 |
| 7,280,810 | B2 * | 10/2007 | Feher ........................ | 455/137 |

(Continued)

FOREIGN PATENT DOCUMENTS

EP     1 408 642 A2     4/2004

(Continued)

OTHER PUBLICATIONS

IEICE Trans. Commun., vol. E87-B, No. 5, May 2004, A New Very High-Rate Wireless LAN System Employing OFDM and MC/CDMA Signals, Onizawa et al., pp. 1227-1234.

(Continued)

*Primary Examiner*—Lester Kincaid
*Assistant Examiner*—Nathan Mitchell
(74) *Attorney, Agent, or Firm*—Nixon & Vanderhye P.C.

(57) ABSTRACT

A unified and flexible signaling method and radio interface accommodate different multiple access schemes, e.g, FDMA, TDMA, CDMA, OFCDM, and IFDMA. Each user data unit is associated with one of several different multiple access techniques that defines how multiple users access communication resources. Each user data unit is processed into discrete samples, where the discrete samples for each user data unit are assigned to one or more respective discrete signal blocks. Discrete samples associated with different multiple access techniques are processed and grouped together into a time slot or packet for transmission over a communication channel.

51 Claims, 12 Drawing Sheets

U.S. PATENT DOCUMENTS

| | | | |
|---|---|---|---|
| 2003/0002433 A1 | 1/2003 | Wu et al. | |
| 2003/0119547 A1* | 6/2003 | Leyh et al. | 455/552 |
| 2003/0137957 A1 | 7/2003 | Kakura et al. | |
| 2004/0066754 A1* | 4/2004 | Hottinen | 370/252 |
| 2004/0071110 A1 | 4/2004 | Guey et al. | |
| 2004/0196812 A1* | 10/2004 | Barber | 370/334 |
| 2005/0202842 A1* | 9/2005 | Brobston et al. | 455/552.1 |
| 2006/0013168 A1* | 1/2006 | Agrawal et al. | 370/335 |
| 2006/0171479 A1* | 8/2006 | Tee et al. | 375/260 |

FOREIGN PATENT DOCUMENTS

| | | |
|---|---|---|
| EP | 1424864 | 6/2004 |
| WO | 2004/095851 | 11/2004 |
| WO | 2005/048640 | 5/2005 |

OTHER PUBLICATIONS

IEICE Trans. Fundamentals, vol. E85-A, No. 12, Dec. 2002, OFDM/CDMA Technologies for Future Broadband Mobile Communication Systems, Umehira et al., pp. 2804-2812.

Radio Access Network Design Concept for the Fourth Generation Mobile Communication System, Yamao et al, Wireless Laboratories.

WWRF/WG4/Subgroup on New Air Interfaces, White Paper, New Air Interface Technologies-Requirements and Solutions, Kaiser et al., Version 1.2, Jul. 21, 2004.

Cyclic-Prefix CDMA: An Improved Transmission Method for Broadband DS-CDMA Cellular Systems, Baum et al., IEEE, 2002, pp. 183-188.

Channel Estimation Improvement for Multi-Carrier DS-CDMA, Guey, 2003, IEEE.

International Search Report and Written Opinion mailed Nov. 22, 2005 in corresponding PCT Application PCT/SE2005/001168.

* cited by examiner

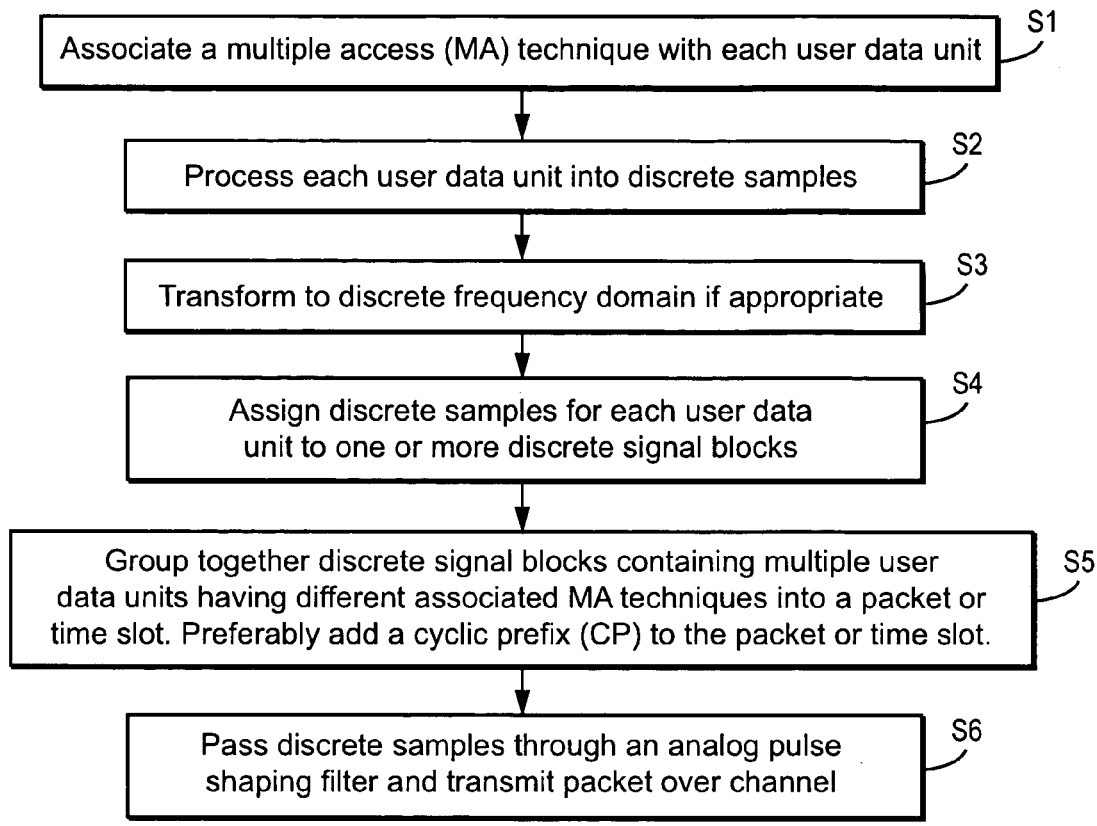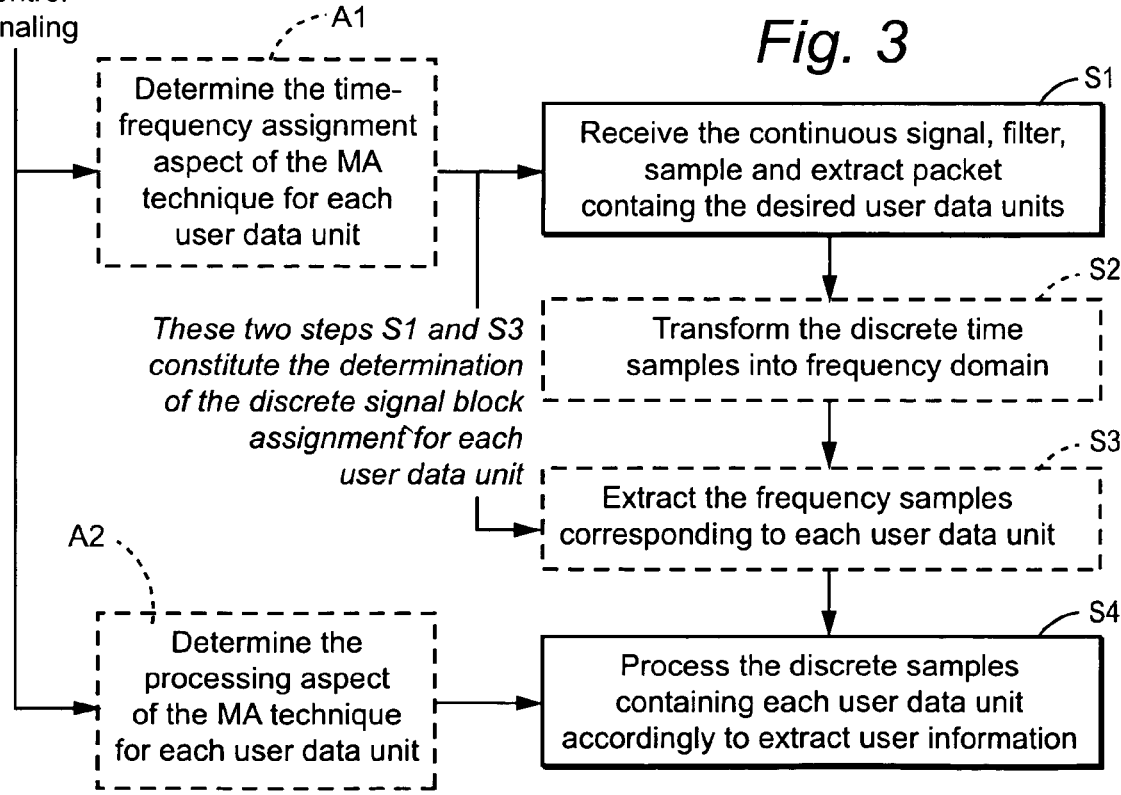

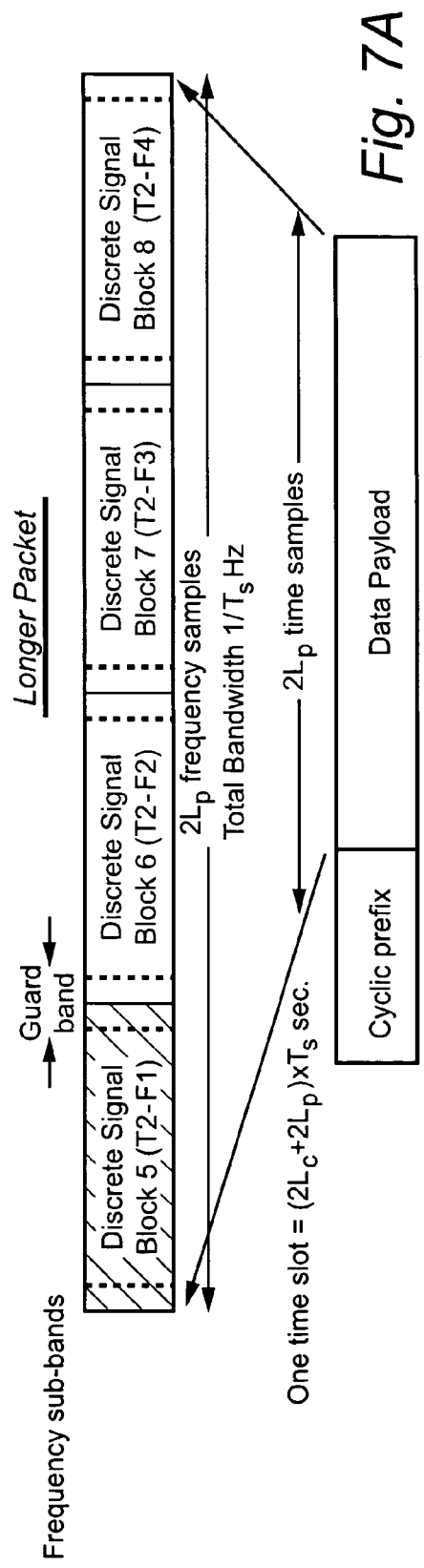
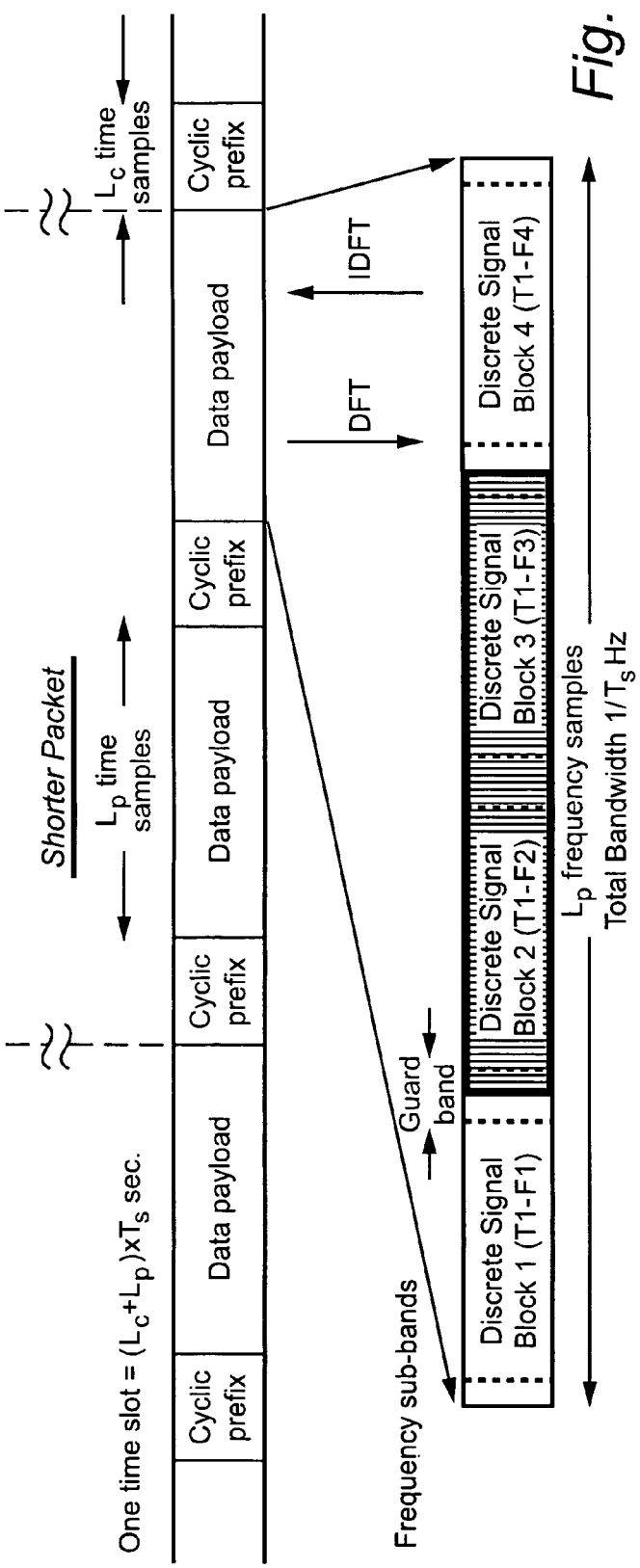
Fig. 7A
Fig. 7B

METHOD, APPARATUS, AND COMMUNICATIONS INTERFACE FOR SENDING AND RECEIVING DATA BLOCKS ASSOCIATED WITH DIFFERENT MULTIPLE ACCESS TECHNIQUES

TECHNICAL FIELD

The present invention relates to access methods used in communications systems, including both wireline and wireless communications systems. However, for purposes of explanation and not limitation, the following description is in the context of a radio communication system as one example application of the invention.

BACKGROUND AND SUMMARY

A radio packet data system includes an access network (AN), a plurality of access terminals (AT), and the air interface defined between the two. The AN may further comprise a plurality of base stations or sectors, each of the base stations/sectors having an associated radio "footprint" that covers a certain geographical area, which may overlap with those of neighboring base stations/sectors. Radio resources are allocated to ATs based on the signal conditions that the ATs experience, requirements of the ATs, and other factors.

Resource allocation is closely linked to the specific multiple access technique used by the access terminals and the access network which defines their interface. As the generations of radio communication systems have evolved 1G→2G→3G→), different multiple access techniques have been explored and adopted. Generally, these access techniques have been divided into three general categories including: frequency division multiple access (FDMA) used in first generation (1G) cellular systems, time division multiple access (TDMA) used in second generation (2G) cellular systems, and code division multiple access (CDMA) used in third generation (3G) cellular systems. In general, a multiple access technique defines how multiple users access a common communications resource, which in a radio communications context, usually includes radio bandwidth.

There are several potential multiple access techniques for fourth generation (4G) cellular systems including direct spread-code division multiple access (DS-CDMA), multi-carrier (MC) DS-CDMA, orthogonal frequency division multiplexing (OFDM), orthogonal frequency code division multiplexing (OFCDM), and interleaved Frequency Division Multiple Access (IFDMA). Each of these multiple access schemes has strengths and weaknesses in terms of practical implementation and performance for various channel conditions. For example, the frequency domain approaches, such as OFDM and OFCDM, are generally more suitable for more highly-dispersive channels when the mobile access terminal is moving with low to moderate speed. On the other hand, the time domain/code domain approaches, such as DS-CDMA and MC-DS-CDMA, are more robust when the mobile access terminal moves at higher speeds. They are also easier to synchronize, and in many typical conditions, may perform at the same level as or better than OFDM and OFCDM.

Because of the wide range of application and deployment scenarios expected in 4G with bandwidth requirements exceeding of 100 MHz, it is unlikely that a single multiple access technique with fixed bandwidth can well serve all scenarios. Past experience also suggests that lengthy standardization processes eventually lead to a compromise that accommodates multiple solutions. Therefore, it is important to design an air interface in which a mixture of multiple access schemes can be accommodated within an entire wideband channel. Although the ITU's IMT-2000 standard encompasses three different "modes", namely, UMTS FDD, UMTS TDD and CDMA 2000, they are effectively three distinct multiple access approaches that are very difficult to integrate. Nor does the IMT-2000 standard permit combining frequency domain approaches such as OFDM and OFCDM with time domain/code domain schemes like DS-CDMA.

The technology described in this application provides a unified and flexible signaling method and radio interface that accommodates different multiple access schemes. Each user data unit is associated with one of several different multiple access techniques. Each multiple access technique defines how multiple users access common communications resources and has two key aspects. The first aspect is the processing of the user data unit into suitable discrete samples. The processing may involve operations such as spreading and code-multiplexing in the case of CDMA, the inverse Discrete Fourier Transform in the case of OFDM and OFCDM, or the combination of these and other various operations. The second aspect of a multiple access technique is the assignment of the discrete samples associated with each user data unit into one or more respective discrete signal blocks in the time-frequency plane. The term "discrete" in "discrete signal block" simply means that the signal block can be distinguished in some fashion from other signal blocks. Each discrete signal block also includes a time attribute and a frequency attribute and can be viewed as a radio resource container that contains a processed user data unit's samples. For example, in a traditional TDMA system, each of the multiple users is assigned a time slot and the entire available bandwidth within that time interval. In a traditional FDMA system, on the other hand, each of the multiple users is assigned a frequency band and can communicate in that band at all times.

Discrete signal blocks carrying processed user data units having different associated multiple access techniques are grouped into a time-slot or packet for transmission over a communication channel. In one non-limiting, example application, that communication channel is a radio channel. The processed and grouped user data units may correspond to plural users or to the same user. The discrete time samples in the packet or time-slot are then preferably converted to a continuous time signal by an analog pulse shaping filter before transmission over the radio interface.

The different multiple access techniques may fall into any of the three broad categories: FDMA techniques, TDMA techniques, and CDMA techniques. As will be appreciated by those skilled in the art, TDMA is an underlying multiple access technique upon which other multiple access techniques build. Example FDMA techniques include OFDM, OFCDM, and Interleaved-FDMA (IFDMA). Example CDMA techniques include DS-CDMA and multi-carrier DS-CDMA.

In one non-limiting, example embodiment, a cyclic prefix may be added to the packet containing the grouped signal blocks before transmission over the communications channel to facilitate receiver processing. Each user data unit associated with a different multiple access technique may be processed into the frequency domain to generate frequency domain samples for most multiple access techniques. In those usual cases, those frequency domain samples are transformed into the time domain to generate discrete time samples. That processing into the frequency domain may be performed using a discrete Fourier transform (DFT) of appropriate length, using for example a fast Fourier transform (FFT), and transforming into the time domain is performed using an inverse discrete Fourier transform (IDFT) of appropriate length, e.g., using an inverse fast Fourier transform (IFFT).

If a condition for the communication changes, e.g., a change in the communication channel or a change in service requested by the user, the multiple access technique associated with one or more of the user data units may be changed in response to the changed condition. This change is easily accommodated by the flexible signaling format in accordance with the present invention.

A receiver receives over the radio interface a continuous signal including a group signal blocks having user data units associated with different associated multiple access techniques. The receiver may "blindly" detect which multiple access technique is associated with each user data unit. Alternatively, part or all of the multiple access technique aspects can be pre-determined during the opening handshake just before the communication is established, as is done in the current generation of cellular systems. Such examples include time slot assignment for each of the multiple users in a TDMA system like GSM and the spreading code assignment in a CDMA system like WCDMA. The partial aspects of a multiple access technique that are not pre-determined have the flexibility of adapting to the changing environment. In this case, the unknown part of the multiple access technique associated with each user data unit may be blindly detected or communicated using control information sent along with each discrete signal block. Another alternative is to associate each user data unit with the unknown aspects of its multiple access technique in control information sent over a separate signaling channel.

Once the discrete signal block assignments of the user data units are determined, the group of discrete signal blocks is filtered and sampled and the appropriate segment extracted. For most multiple access techniques, the discrete samples are discrete time samples which are transformed into frequency domain samples for subsequent processing. The frequency domain samples in the discrete signal blocks associated with each user data unit are processed in accordance with the associated multiple access technique to permit data corresponding to each user data unit to be extracted. For access point type nodes in a radio context, the receiver may employ a wideband receive filter. Alternatively, if the communications node is a mobile access terminal, a narrower, bandpass receive filter tuned to its desired frequency band may be employed.

BRIEF DESCRIPTION OF THE DRAWINGS

FIG. 2 is a flowchart diagram illustrating procedures for processing and transmitting a packet in accordance with a non-limiting example application;

FIG. 3 is a flowchart diagram illustrating procedures for receiving packets formatted in accordance with the non-limiting example application of FIG. 1;

FIGS. 7A and 7B illustrate example formats to support a variable length time slot or packet;

DETAILED DESCRIPTION

The following description sets forth specific details, such as particular embodiments, procedures, techniques, etc., for purposes of explanation and not limitation. But it will be appreciated by one skilled in the art that other embodiments may be employed apart from these specific details. For example, although the following description is facilitated using non-limiting examples, the present invention may be employed to in any system where multiple access techniques are used. In some instances, detailed descriptions of well-known methods, interfaces, circuits, and signaling are omitted so as not obscure the description with unnecessary detail. Moreover, individual blocks are shown in some of the figures. Those skilled in the art will appreciate that the functions of those blocks may be implemented using individual hardware circuits, using software programs and data, in conjunction with a suitably programmed digital microprocessor or general purpose computer, using application specific integrated circuitry (ASIC), and/or using one or more digital signal processors (DSPs).

Figure 1:
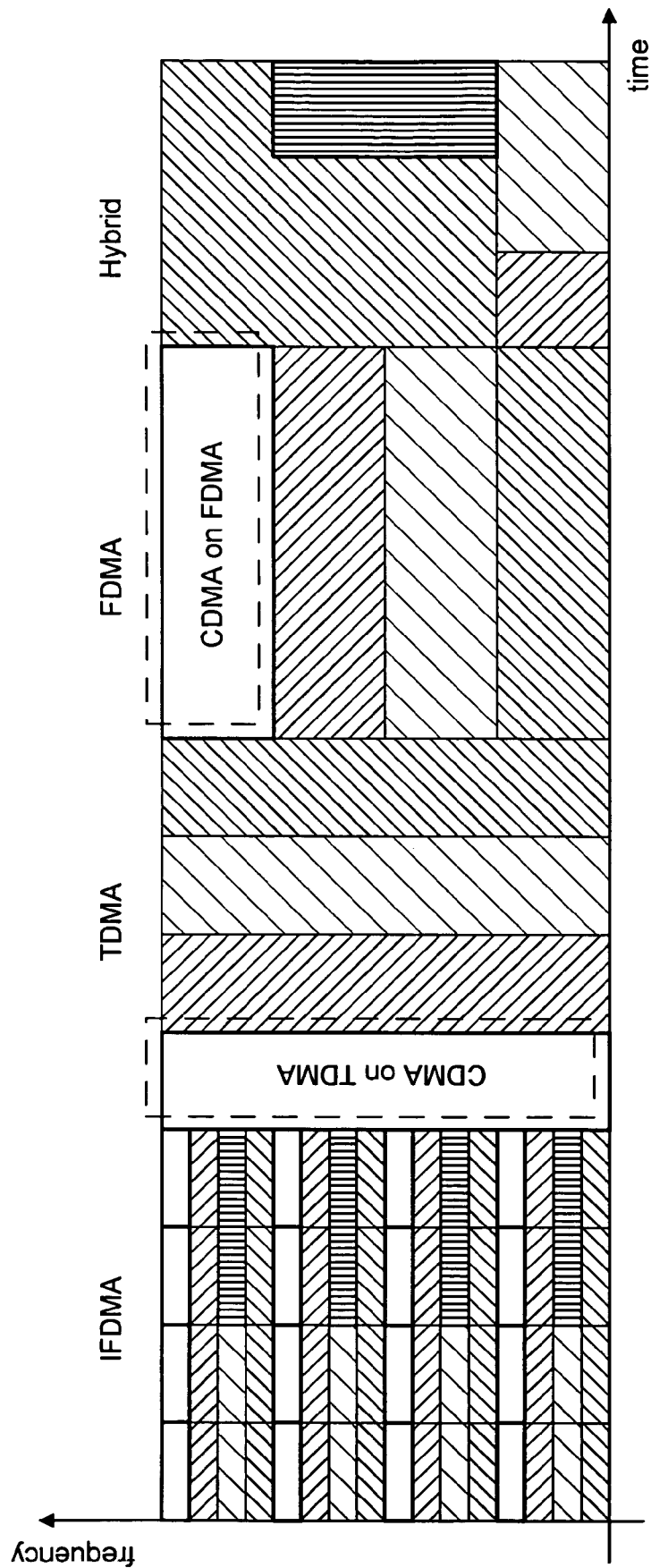
FIG. 1 depicts various multiple access techniques in a frequency-time plane.

FIG. 1 illustrates how different multiple access techniques allocate communication resources in a time-frequency plane. Each multiple access technique includes a time resource attribute and a frequency resource attribute. Each block corresponds to a discrete signal block of radio resources that includes a time resource attribute and a frequency resource attribute defined by its multiple access technique. Each discrete signal block can be used to carry one or more units of user data. The example, non-limiting multiple access techniques shown include: IFDMA, TDMA, CDMA on TDMA, FDMA, CDMA on FDMA, and a hybrid. A hybrid multiple access, in which two or more different access techniques are used, may vary both time and frequency in allocating resources rather than just one or the other. The flexible signaling format in accordance with the present invention accommodates all these as well as other unforeseen and future multiple access techniques.

FIG. 2 illustrates in flow chart form example procedures that may be implemented at one or more nodes to transmit information using more than one multiple access technique. In step S1, a multiple access (MA) technique is associated with each user data unit, and each user data unit is process into discrete samples (step S2). Each "user data unit" includes an information-bearing discrete sample sequence corresponding to a particular user. Step S3 describes optional processing user data units (if necessary based on the multiple access technique associated with the user data units) to generate corresponding frequency samples. The discrete samples for each user data unit are assigned to one or more discrete signal blocks (step S4). A discrete signal block is understood in the context of the time-frequency plane, (an example of a time-frequency plane is shown in FIG. 1), and includes both a time communications resource and a frequency communications resource allocation corresponding to an area identified by one of the patterns shown in FIG. 1. Discrete signal blocks containing multiple user data units with different associated multiple access techniques are grouped together into a single packet or time-slot (step S5). As described further below, a cyclic prefix (CP) may be added to that packet or time-slot (the cyclic prefix is optional). The packet samples (and any associated cyclic prefix) are passed through analog pulse shaping filter and transmitted with other packets over a communications channel (step S6).

FIG. 3 is a flow chart diagram that illustrates example procedures at a receiver for extracting user data from the flexible signaling structure transmitted in accordance with the procedures of FIG. 2. The first step is to receive, filter, and sample the continuous signal transmitted over the radio interface, and then, extract a packet that includes the discrete signal blocks associated with the desired user data units (step S1). This time domain extraction is the first step of extracting the discrete signal blocks associated with the desired user data units from the time-frequency plane and may require the input from a control signal (A1) to determine the starting point and time duration of the extraction if such information has not been blindly detected or pre-determined at the receiver. Unless the entire packet is dedicated to one user and the transmitter processing did not involve IDFT processing, the extracted discrete time samples are to be transformed into frequency domain samples (step S2). For example, IFDMA, FDMA, AND hybrid techniques generally all require step S2, but a TDMA technique may not. The frequency attribute of the discrete signal block assignment aspect of the multiple access technique associated with each user data unit is then determined, similarly to the time domain extraction, and the frequency samples associated with each user data unit are extracted (step S3), completing the discrete signal block extraction for the desired user data units. The discrete samples for each user data unit are then processed according to the processing aspect of the associated multiple access technique to extract the user information (step S4). Similarly, the processing aspect of a multiple access technique can be blindly detected or provided by a control signal (A2).

Figure 4:
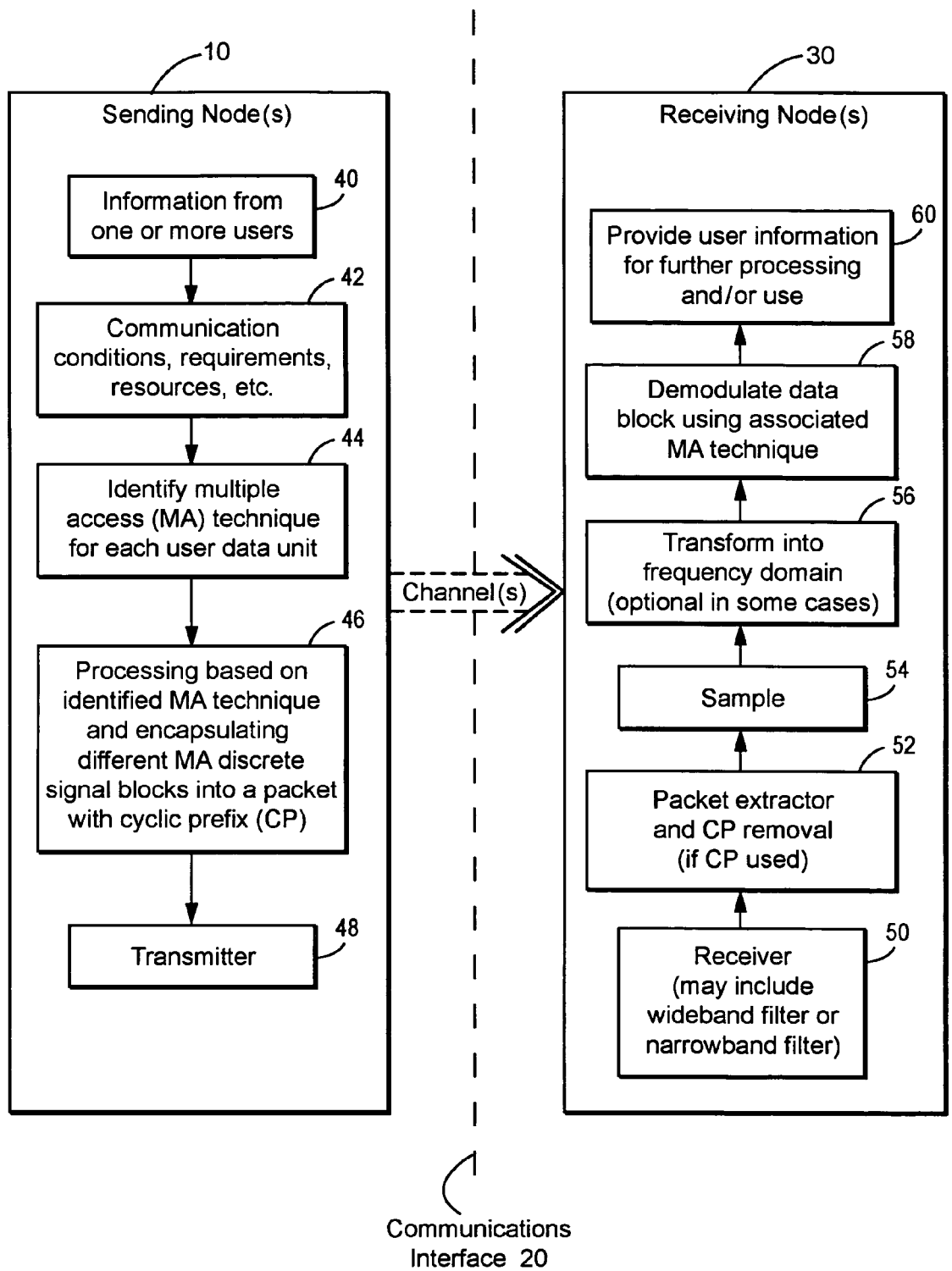
FIG. 4 is function block diagram illustrating a sending node(s) communicating with a receiving node(s) over a communications interface.

FIG. 4 illustrates an example communications system that implements the flexible signaling method and communications interface. Information is processed and sent from a sending node (or more than one sending node) over a communications interface 20 to one or more receiving nodes 30 using one or more communications channels. The communication channels may be wireless channels or wireline channels. The sending node(s) 10 includes a number of processing blocks which may be implemented using suitably configured or programmed electronic circuitry. Information from one or more users (block 40) along with communication conditions, requirements, and resources etc., associated with communicating that information (block 42) are provided. The multiple access technique for each user data unit is identified (block 44). Those user data units are processed based on their respective identified multiple access technique. Discrete signal blocks are formed that encapsulate user data units with different multiple access techniques into a single packet, and a cyclic prefix is preferably included with that packet to facilitate demodulation or decoding at the receiver (block 46). Further details of block 46 are described below in conjunction with FIG. 5. The packet is appended to other data packets and transmitted by transmitter 48 over the communications interface 20 on one or more channels. The transmitter 48 may include an analog pulse shaping filter.

The receiver 50 in the receiving node(s) 30 receives a signal over the channel(s) and may include a wideband filter or a narrowband filter depending on the application. For example, in a mobile radio communications context, a base station receiver might employ a wideband filter while a mobile access terminal receiver might employ a narrowband filter tuned to its desired frequency band. A packet extractor 52 identifies individual packets and removes the cyclic prefix if one is present. The individual packet is sampled in block 54, and the sample signals are transformed into the frequency domain in block 56 (optional depending on access technique used). Each block of frequency domain data is demodulated using an appropriate technique corresponding to its associated multiple access technique (block 58). The obtained user information is then further processed and/or used (block 60) by one or more applications.

Figure 5:
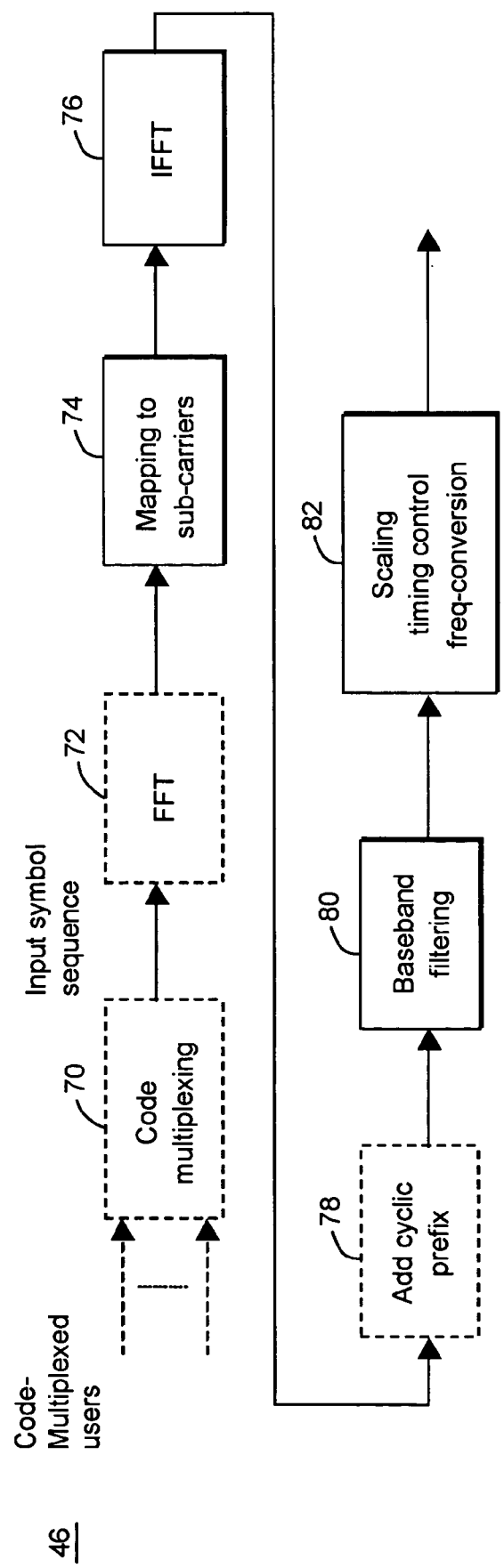
FIG. 5 illustrates further details of processing functions performed by block 46 in FIG. 4.

FIG. 5 illustrates in more detail the functions performed in block 46 for each user data unit at the transmitter. The dashed-line blocks are optional depending on the multiple access technique. Code multiplexed user information is selected for processing in code multiplexer 70 to generate an input symbol sequence in the time domain. The time domain sequence is converted in the fast Fourier transform (FFT) block 72 to generate a frequency domain sequence mapped to appropriate frequency sub-carriers in block 74 and converted back to the time domain in the inverse FFT (IFFT) block 76. The resulting discrete samples are combined with those corresponding to other user data units to form a packet. A cyclic prefix may be appended to this packet before it undergoes baseband filtering (block 80) and scaling, timing control, and frequency conversion to RF (block 82) for transmission.

Figure 6:
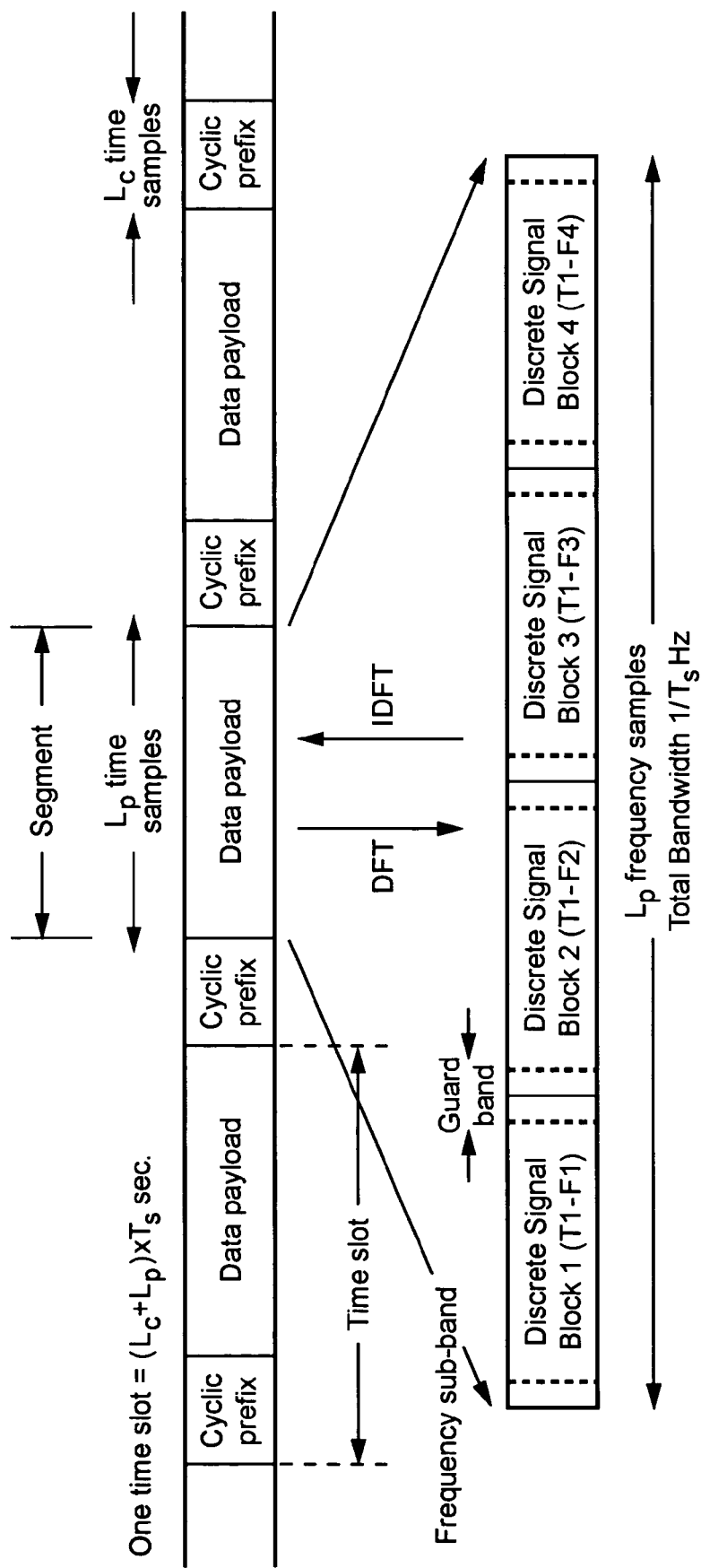
FIG. 6 illustrates an example signaling format.

FIG. 6 illustrates an example of a flexible signaling format that may be used to transmit data packets that contain one or more different multiple access schemes. With this signaling structure, samples associated with one or more various multiple access techniques may be encapsulated in a unified format into one packet. A data payload is the part of a packet that includes the previously-described, processed and grouped user data units. Each data payload, also labeled as a "segment" in FIG. 6, may be optionally coupled with a corresponding cyclic prefix (CP) to form a single time slot or packet. Multiple packets or time-slots are appended together as shown. Each data payload includes $L_p$ time samples, and each cyclic prefix includes $L_c$ time samples. The duration of a single time-slot is thus $(L_c+L_p)T_s$ seconds, where $T_s$ is the sampling period. The total bandwidth corresponding to $L_p$ frequency samples is $1/T_s$ Hz.

The frequency domain representation of one data payload or segment is shown in the lower part of FIG. 6 and may include one or more subsets. In conjunction with their time domain assignment attribute, these subsets form the discrete signal blocks that carry the processed user data units. The term discrete signal block includes, but is not limited to frequency sub-bands, and each discrete signal block includes a time resource attribute and a frequency resource attribute. For example, discrete signal block 1 is associated with a time resource attribute 1 (T1) and a frequency resource attribute 1 (F1). Each discrete signal block may correspond to data from different users using different multiple access techniques. Discrete signal blocks 1, 2, 3 and 4 are shown in the example in FIG. 6 separated by corresponding guard bands. Those discrete signal blocks may be readily transformed into the time domain using the inverse discrete Fourier transform (IDFT). It should be understood that appending a cyclic prefix is an optional feature and may not even be required, for example, in the case of DS-CDMA. But a cyclic prefix ensures a uniform format for all multiple access schemes and helps facilitate the necessary conversion between time and frequency domains. If a Fast Fourier Transform (FFT) is used to the implement the DFT, the payload length $L_p$ is usually chosen to be a power of two.

In one example implementation, each discrete signal block can be viewed as a sub-set of sub-carriers. Those sub-carriers in the discrete signal block may be contiguous or non-contiguous. Even greater flexibility can be achieved by aggregating multiple time-slots or discrete signal blocks. For example, multiple DS-CDMA carriers can be placed into contiguous discrete signal block to increase the data rate, while maintaining better orthogonality of the narrower discrete signal block bandwidth. When several consecutive time-slots are aggregated, the discrete signal block bandwidth decreases proportionally, and therefore, more sub-carriers may be accommodated.

It may also be desirable to accommodate variable length packets or time slots. For example, there may be instances when it is more effective or efficient to use either longer packets or shorter packets. FIG. 7A shows a longer data payload as compared to the payload shown in FIG. 6, which is repeated in FIG. 7B for easy comparison. The longer packet or time slot is twice as long corresponding to $(2L_c+2L_p)T_s$ seconds, where $T_s$ is the sampling period. The total bandwidth corresponding to $2L_p$ frequency samples is $1/T_s$ Hz. One example where this kind of flexibility is useful comes from the hybrid access mode shown in FIG. 1. The shaded discrete signal block 1 corresponds to ⅔ of the hybrid resources in the time domain but only ¼ in the frequency domain, as can be seen in the lower right-hand corner of FIG. 1. The bold-blocked discrete signal blocks 2 and 3 take up half of the frequency bandwidth but only ⅓ of the resources in the time domain (T1). FIG. 7 shows how different hybrid users can be readily accommodated with variable length payloads.

Figure 8:
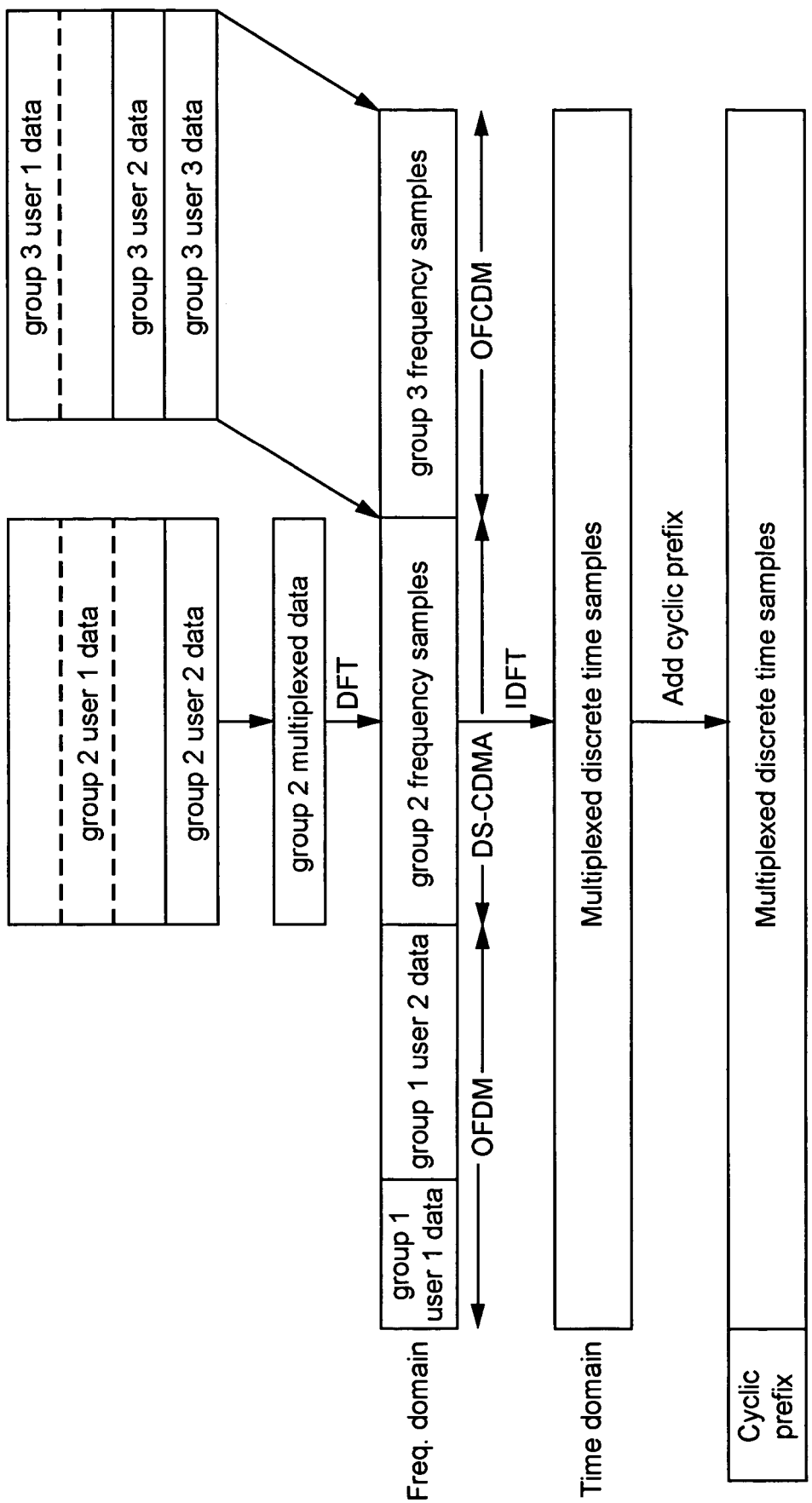
FIG. 8 illustrates incorporating different user data using different access techniques in a single time-slot or packet in the example signaling format illustrated in FIG. 4.

FIG. 8 shows the encapsulation of different multiple access schemes and different users into one packet. There are three different access techniques used in this example including: OFDM (shown on the left side under frequency domain), DS-CDMA (shown in the middle) and OFCDM (shown on the right of the figure). The OFDM technique is employed by group 1, user 1 data, and group 1, user 2 data. Different user groups may correspond to different applications or services that have distinct requirements. The CDMA technique is used by group 2, user 1 data and user 2 data. The OFCDM technique is used by group 3, user 1 data, group 3, user 2 data, and group 3, user 3 data. The OFDM group and user data is simply concatenated. The group 2, user 1 and user 2 data are code-multiplexed and transformed into the frequency domain using the discrete Fourier transform (DFT), generating group 2 frequency samples. The group 3, user 1, 2, and 3 data are multiplexed into group 3 frequency samples without the need for any DFT since the user data is already in the frequency domain. All three OFDM, DS-CDMA, OFCDM data blocks are then converted into the time domain using the inverse discrete Fourier transform (IDFT) to generate a payload of multiplexed discrete time samples. To combat inter-symbol interference and to improve demodulation at the receiver, a cyclic prefix may be added to the multiplexed discrete time samples to generate a signal time slot or data packet for transmission over the radio channel.

Figure 9:
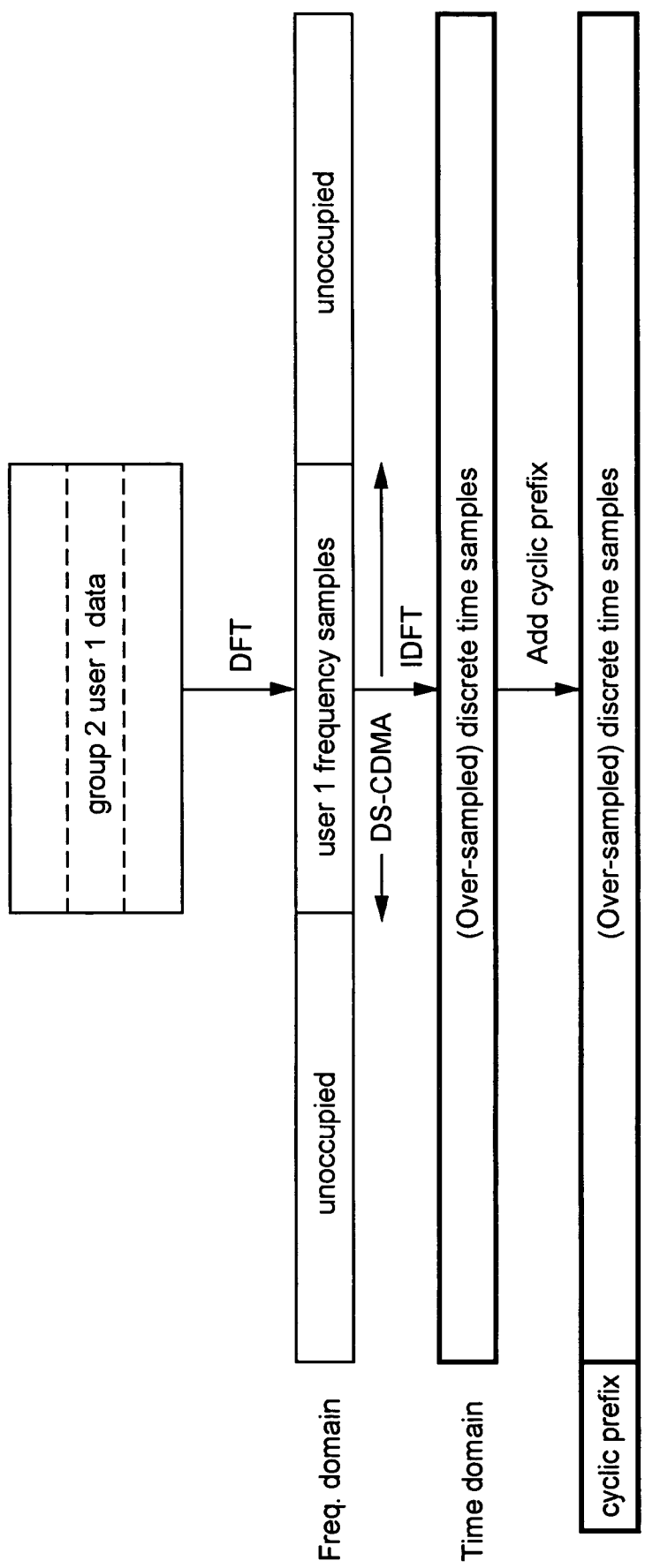
FIG. 9 illustrates incorporating one user's data in a single time-slot or packet.

The format and processings of FIG. 8 are appropriate in the non-limiting example context of radio communications for a radio base station transmitter transmitting to multiple mobile access terminals in the downlink direction. The format is also suitable for uplink transmissions from individual mobile access terminals, as shown in FIG. 9. Since there is only one user 1 in group 2, and assuming only one access technique (here CDMA) is used for the user, the group 2 user 1 data is DFTed and placed in the CDMA block. The procedures are the same as described for FIG. 8 except that the other blocks are unoccupied and are used by other users with uplink transmissions. At the base station, the transmissions from multiple access terminals are combined to complete packet or time slot.

Figure 10:
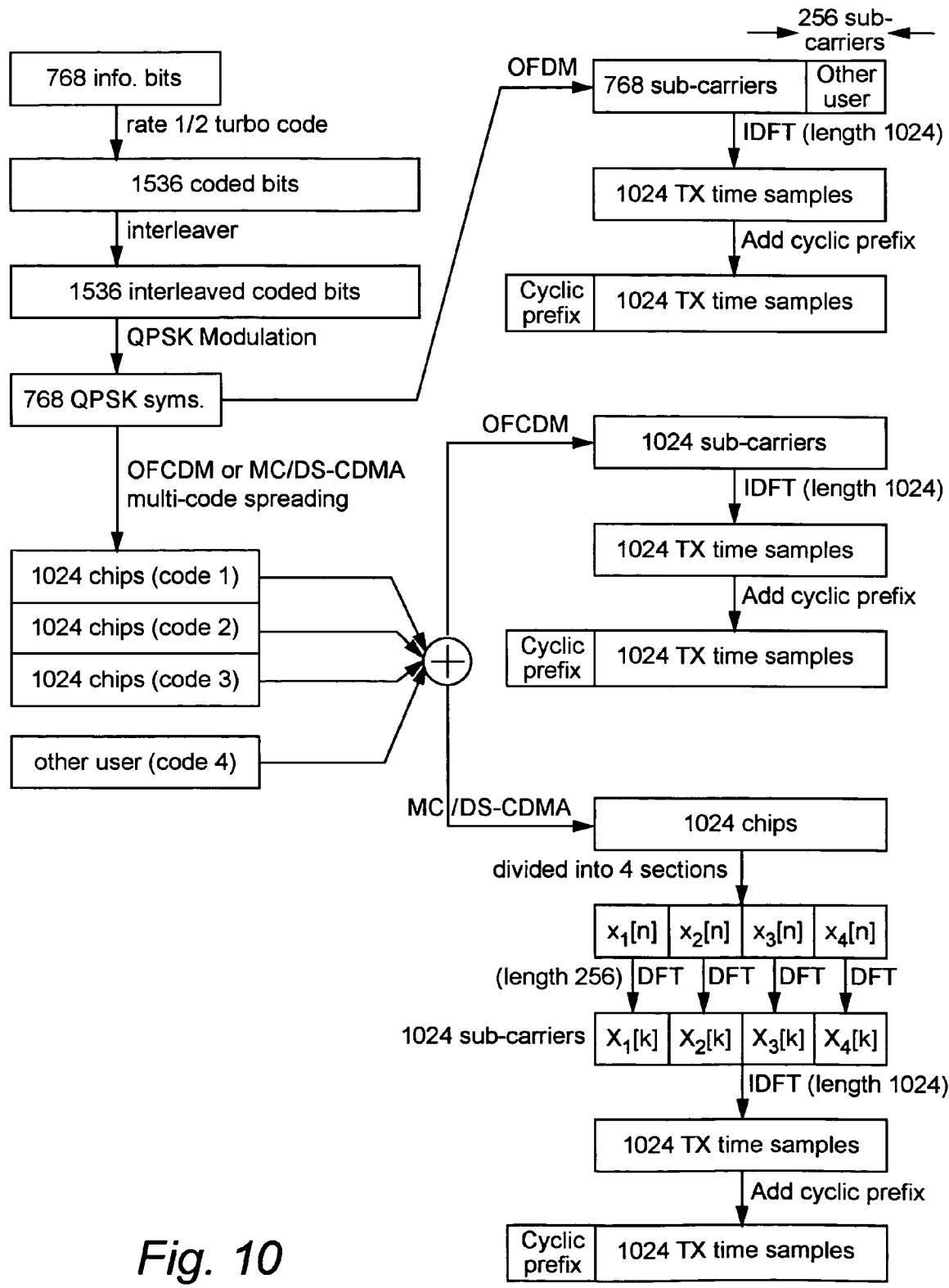
FIG. 10 illustrates a non-limiting example of processing user data associated with different multiple access techniques for transmission in a single packet or time slot.

FIG. 10 illustrates one example approach for modulating and processing data units that employ different multiple access techniques into a single packet. In this example, 768 information bits are turbo-coded at a rate of ½ to generate 1536 coded bits. These bits are interleaved and then QPSK modulated to generate 768 QPSK symbols. For OFDM type access, these 768 symbols are treated as 768 sub-carriers and inserted into a data word 1024 sub-carriers long. The remaining 256 sub-carriers come from another user. The 1024 carriers in the word are converted from the frequency domain into the time domain using an IDFT of length 1024 to generate 1024 time samples. A cyclic prefix may be added before transmitting the data packet including the 1024 time samples.

If the multiple access technique corresponds to OFCDM or MC/DS-CDMA, (both employ multi-code spreading), the 768 QPSK symbols are spread using three different codes, each of which is 1024 chips long. The spread symbols are then summed along with a fourth code used to spread the symbols from another user. The network can assign any number of new codes to one user or another user as the network determines as long as codes are available. For OFCDM, 1024 chips summed in the summer are treated as 1024 sub-carriers, which are then converted to the time domain using IFDT, and a cyclic prefix is added to the 1024 time samples.

For MC/DS-CDMA type access, the 1024 chips generated from the four codes by the summer are divided into four sections $x_1[n]$–$x_4[n]$. Each of the four sections has a length of 256 chips. Each section is converted into the frequency domain using a DFT to generate four groups of sub-carriers, each with a length of 256. The four sections combined include 1024 sub-carriers which are transformed using the IFDT into the time domain to generate 1024 time samples. A cyclic prefix is added to those time samples before transmission.

Figure 11:
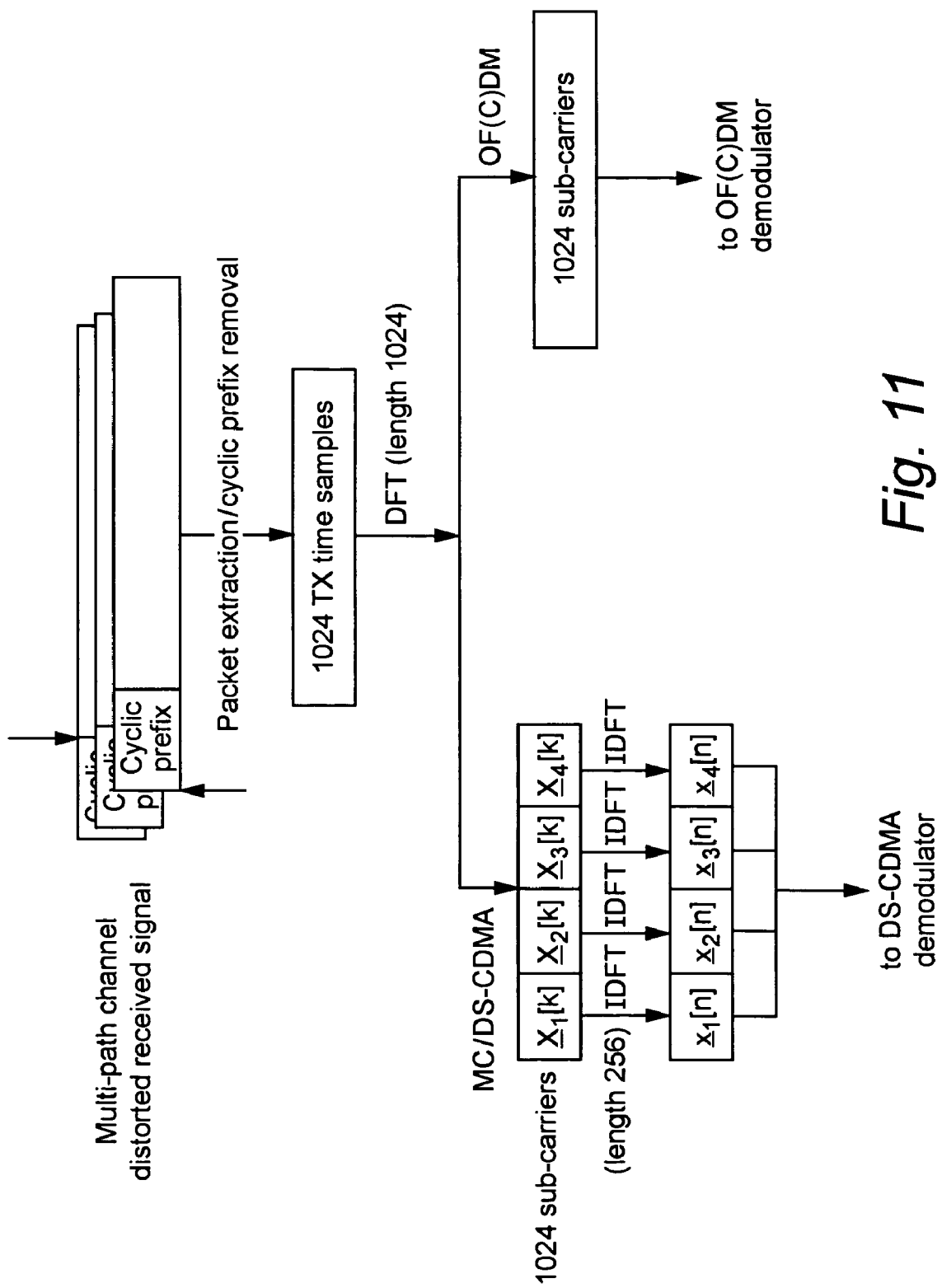
FIG. 11 illustrates a non-limiting example of processing a packet at a receiver that includes user data associated with different multiple access techniques.

An example receiver processing in accordance with the flexible signaling format is shown in FIG. 11 following the transmitter example shown in FIG. 10. In a radio environment, the received signal is typically a multipath signal which is also distorted by the radio channel. The signal includes multiple packets which must be identified, extracted, sampled, and any cyclic prefix removed. Each extracted packet includes 1024 transmitter time samples. A DFT of length 1024 is performed on those time samples to generate 1024 sub-carriers in the frequency domain. For OFDM and OFCDM, those 1024 sub-carriers are simply provided to an OFDM or OFCDM demodulator, respectively. For multiple carrier DS-CDMA, the 1024 sub-carriers are divided into four sections $X_1[k]$–$X_4[k]$. Each section of 256 sub-carriers is then transformed into the time domain using the IDFT to generate four sections of time samples $x_1[n]$–$x_4[n]$, each having 256 time samples. Those four sections of time samples are provided to a DS-CDMA demodulator for demodulation.

Figure 12:
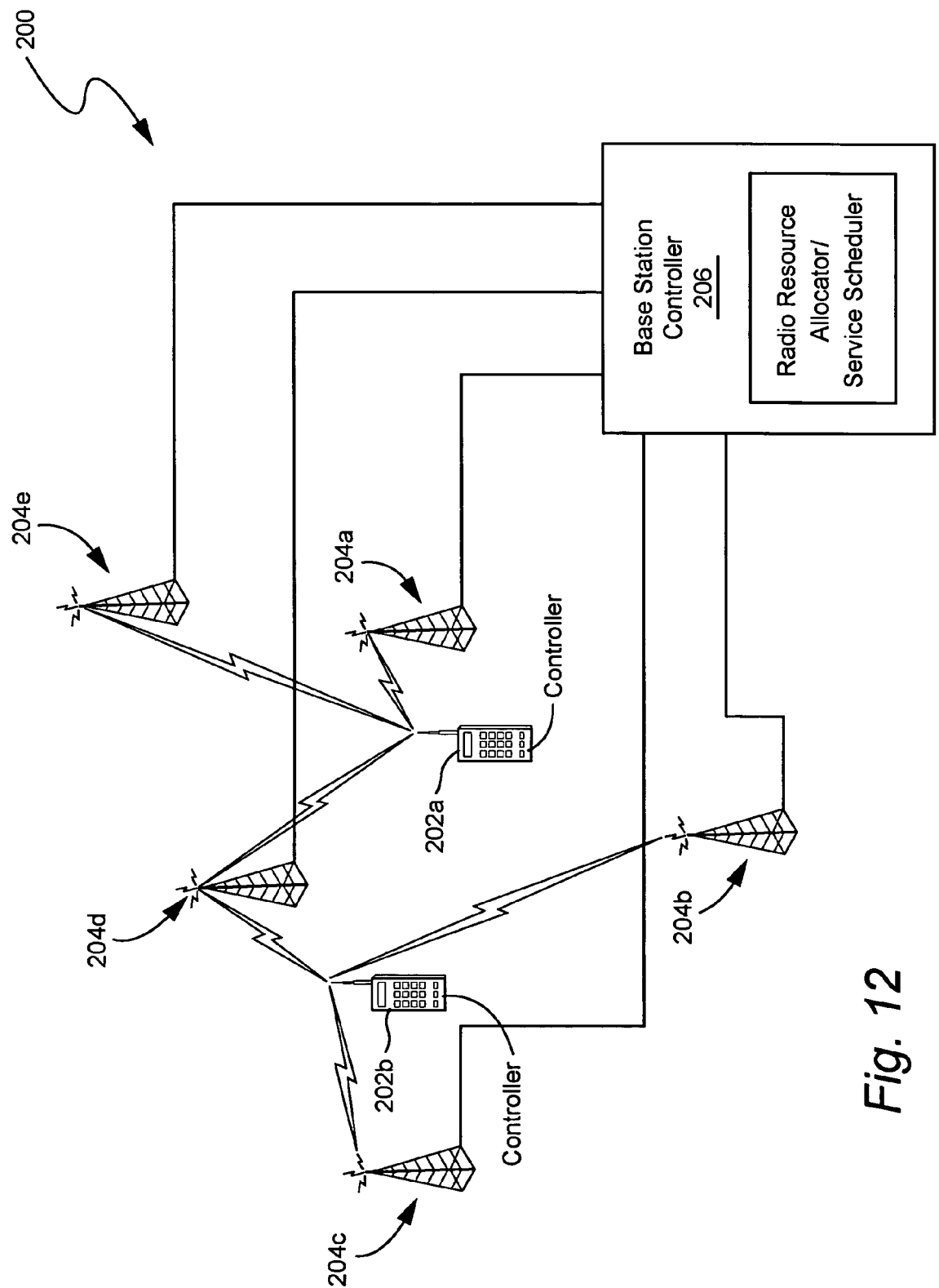
FIG. 12 illustrates a cellular radio communications system.

Referring now to a non-limiting example application to radio communications, FIG. 12 shows a radio packet data communication system 200 which includes mobile access terminals (ATs) 202a and 202b, a plurality of base stations 204a-204e, and a base station controller 206. As used herein, the term "access terminal" may include, but is not limited to, a cellular radio transceiver, a Personal Communications System (PCS) terminal, radio transceiver, a personal digital assistant (PDA) that can include a radio transceiver, pager, Internet/intranet access, Web browser, organizer, calendar and/or a GPS receiver, laptop or palmtop receiver, or an appliance that includes a radio transceiver. The base station may be associated with service "sectors." The access terminals 202a, b communicate via the base stations 204a-204e base stations which handle radio communication with the access terminals 202a and 202b. The base stations 204a-204e also communicate with the base station controller 206 which includes stored program control and processor resources for managing the radio communications system 200.

Figure 13:
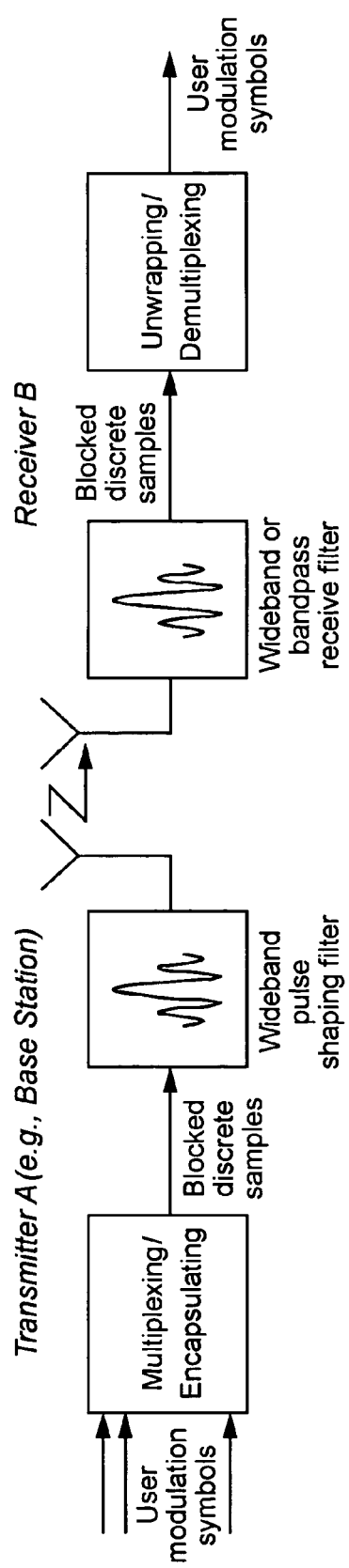
FIG. 13 illustrates an example of a communications system using a wideband pulse shaping filter and a wideband or bandpass receive filter.

FIG. 13 shows a baseband equivalent of a transceiver architecture that may be employed in the cellular communication system shown in FIG. 12 or any other type of radio communications system. Data symbols from multiple users are multiplexed and then encapsulated at the transmitter A (e.g., in one or more base stations) into blocks of discrete samples according to their respective multiple access schemes, for example, as illustrated in FIGS. 5-7. Once the discrete (sampled) time representation of each data packet (or block, time slot, etc.) to be transmitted is determined, a corresponding continuous waveform can be synthesized by passing the discrete time samples through a wideband, pulse shaping filter.

The receiver (such as an access terminal in the cellular system example) can use a wideband, front-end filter matched to the transmit pulse shape. The filtered output is sampled for discrete processing. Such discrete processing includes unwrapping the packet using a combination of DFT and IFDT and demodulation techniques depending upon the multiple access technique and modulation technique employed for each data packet. See as one example the process shown in FIG. 11. The multipath, channel-distorted, received signal is the sum of several copies of the original transmitted signal with different delays and complex coefficients. The receiver first extracts the section of the signal that contains one packet of samples for all multipaths so that the extraction corresponds to the cyclic convolution of the transmit signal with the channel's impulse response. The DFT converts the time samples into the frequency domain, at which point demodulation can be performed for frequency-domain multiple-access schemes such as OF(C)DM, or frequency sub-bands can be isolated for further processing for multi-carrier DS-CDMA or a mixture of time and frequency domain schemes.

Alternatively, the receiver may use a narrower, bandpass filter to extract only the frequency bands that contain the intended data to reduce the sampling rate. This may be preferred for low rate access terminals that can be adequately served by narrowband transmission. In a multi-carrier DS/CDMA example, data directed to a low rate terminal may be allocated to only one of the frequency bands. Instead of receiving the entire wideband signal, the receiver may use a narrowband filter tuned to the corresponding frequency bands and treat the received signal as a single carrier to simplify reception and processing.

Figure 14:
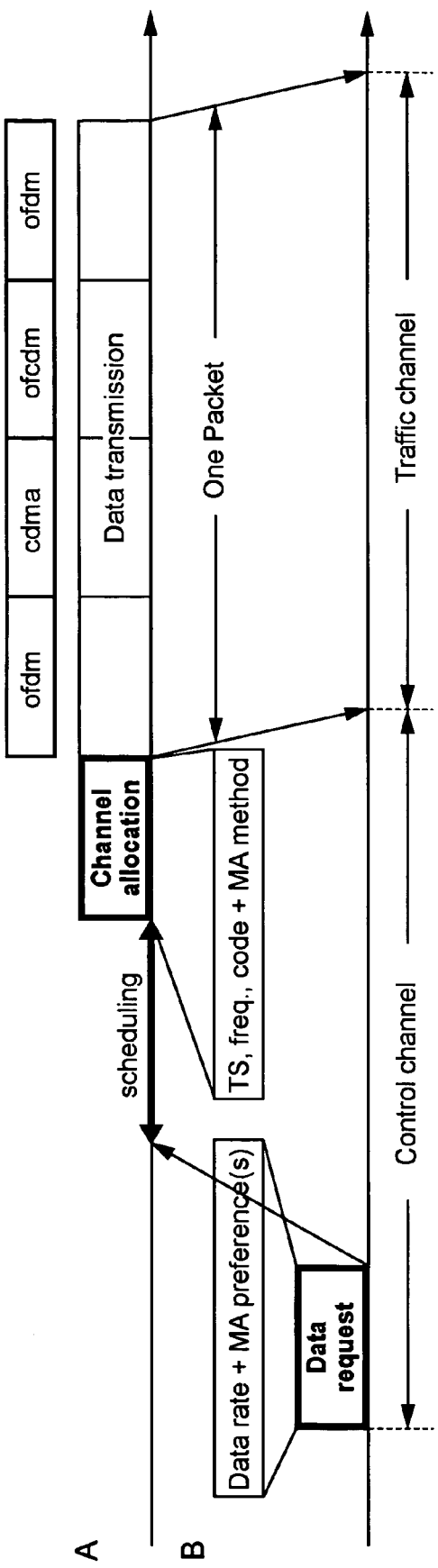
FIG. 14 illustrates a non-limiting signal format for a use in communicating control type information including multiple access type between communicating nodes.

Different techniques may be used to "unwrap" the received signal and to detect which types of processing need to be employed to demodulate the information in a particular data packet. First, the receiver can "blindly" detect the modulation scheme that goes with each data unit included in a data packet. For example, the receiver may perform the demodulation and decoding for every possible hypothesis of the various aspects of the multiple access schemes and compute a metric that reflects the likelihood of that hypothesis. The hypothesis with the highest likelihood is chosen. A common likelihood metric is the Cyclic Redundancy Check (CRC) bit that is computed from a sequence of redundancy bits appended to an encoded data packet. An example for blindly detecting the starting point and interval of a variable-length TDMA packet can be found in U.S. Pat. No. 6,594,793, "Methods And Systems For Multiplexing And Decoding Variable Length Messages In Digital Communications Systems," the disclosure of which is incorporated here by reference. Alternatively, the multiple access technique associated with each data unit may be conveyed along with the data packet or by a control signal sent over a control/signaling channel. The latter approach is illustrated in FIG. 14. Here, a data request for transmission from a user (a channel request) is transmitted via a control channel to a radio resource scheduling entity, e.g., a base station controller. That data request includes a number of factors including, for example, requested data rate and multiple access preference(s). When the channel is allocated in response to that data request, included in that channel allocation message is the multiple access technique associated with that data unit along with the time slot, frequency, code, or allocated access resource corresponding to the preferred multiple access.

As described above, various modulation and multiple access schemes exhibit unique characteristics and are suitable in different transmission scenarios depending on factors such as (not limited) channel conditions, interference, receiver complexity, user preference, and user demand. Since these factors may change, and some factors may change rapidly, the multiple access schemes from time slot to time slot may have to be adapted accordingly. Such adaptation may be achieved by providing control signals that carry explicit multiple access scheme information. In addition to signaling channels to provide this kind of information, a physical pilot channel must be present in each sub-band for synchronization and channel estimation. For frequency domain multiple access schemes, such as OFDM and OFCDM, that pilot channel is usually in the form of pilot symbols periodically inserted in the sub-carriers. For time domain schemes such as multiple and single carrier DS-CDMA, it is usually in the form of Pseudo-random sequences multiplexed in the time domain. Regardless of which form it takes, the pilot channel must uniquely identify the sub-band it is associated with. The pilot and signaling channel structures should be designed in such a way that each sub-band is self-contained carrier cases used to carry data intended for narrow band terminals. Although signals from other sub-bands may be used to improve channel estimation or may contain useful system information, a low cost, low rate, narrow band device should be able to function without them.

In summary, the approach described provides a flexible air interface structure with a blocked format in both time and frequency domains defining the basic unit of the air interface. Cyclic prefix and DFT-based discrete representation/processing enables easy manipulation and transformation between the time and frequency domains. With such structure, the various multiple access schemes such as OFDM, OFCDM, IFDMA and (Multi-Carrier) DS-CDMA can be multiplexed and encapsulated into a common packet. A simple and unified transceiver architecture that uses either a single wideband RF front-end filter or a narrowband bandpass filter tuned to the desired frequency band further simplifies the communication hardware design. When operated adaptively with suitable control signaling, the overall communication network performance and robustness can be greatly improved by dynamically selecting the most suitable multiple access schemes according to factors such as channel condition, equipment preference, and service requirements, etc.

While the description includes various example embodiments, it is to be understood that the claims are not to be limited to the disclosed example embodiments. On the contrary, the claims are intended to cover various other embodiments, implementations, modifications, and equivalent arrangements.

The invention claimed is:

1. A communications method, comprising:
processing each of multiple user data units into discrete samples, where each user data unit is associated with one of plural different multiple access techniques, where each multiple access technique defines how each of multiple user data units is processed into discrete samples and allocated in a time-frequency plane;
assigning the discrete samples for each user data unit to one or more respective discrete signal blocks; and
grouping together discrete signal blocks containing multiple user data units having different associated multiple access techniques for transmission over a communications channel,
wherein the grouping includes grouping discrete signal blocks containing the discrete samples associated with the multiple user data units having different associated multiple access techniques into a time-slot or a packet for transmission over the communications channel.

2. The method in claim 1, wherein the processed user data units in the group correspond to plural users or to the same user.

3. The method in claim 1, wherein the multiple access techniques include one or more of the following: frequency division multiple access (FDMA) techniques, time division multiple access (TDMA) techniques, and code division multiple access (CDMA) techniques.

4. The method in claim 3, wherein the FDMA techniques include orthogonal frequency division multiplexing (OFDM), orthogonal frequency code division multiplexing (OFCDM), and interleaved-FDMA (IFDMA), and wherein the CDMA techniques include direct sequence (DS)-CDMA and multi-carrier DS-CDMA.

5. The method in claim 1, further comprising:
transmitting the grouped discrete signal blocks over the communications channel.

6. The method in claim 1, further comprising:
adding a cyclic prefix to the grouped discrete signal blocks before transmission over the communications channel.

7. The method in claim 1, wherein a length of the time-slot or a packet is variable.

8. The method in claim 1, wherein the processing further comprises:
processing user data units into the frequency domain to generate frequency domain samples;
transforming the frequency domain samples into the time domain to generate the discrete time samples.

9. The method in claim 8, wherein the processing of user data units into the frequency domain includes performing a discrete Fourier transform (DFT) of appropriate length on one or more of the user data units, and
wherein the transforming includes performing an inverse discrete Fourier transform (IDFT) of appropriate length of the frequency domain samples.

10. The method in claim 1, further comprising:
determining that a condition for the communication has changed, and
changing the multiple access technique associated with one or more of the multiple user data units in response to the changed condition.

11. The method in claim 1, further comprising:
associating each multiple user data unit with part or all aspects of its associated multiple access technique in control information to be sent along with each discrete signal block; or
associating each user data unit with part or all aspects of its associated multiple access technique in control information to be sent over a signaling channel.

12. The method in claim 1, further comprising:
detecting at a receiver a multiple access technique associated with each user data unit,
wherein the receiver employs a wideband or narrowband filter.

13. The method in claim 1 implemented in a network node for communicating with plural access terminals, each access terminal associated with a user, the method further comprising:
at one of the access terminals, processing one or more user data units into discrete samples, assigning the discrete samples to a portion of a communications resource packet, and transmitting the portion to the network node;
wherein other access terminals assign and transmit their respective discrete samples using other portions of the communications resource packet.

14. A communications method, comprising:
receiving over a communications channel a signal containing signals corresponding to multiple user data units each having an associated multiple access technique, where each multiple access technique includes a first part that defines how each of multiple user data units is processed into discrete samples and a second part that defines how processed samples corresponding to each of multiple user data units is allocated in a time-frequency plane;
determining a discrete signal block assignment of the multiple access technique associated with each user data unit;
according to the determined discrete signal block assignment, extracting from the received signal a segment containing the signals corresponding to one or more desired user data units;
sampling the extracted segment to produce a sequence of discrete samples;
if necessary, transforming the discrete samples into frequency domain samples;
extracting from discrete samples in the frequency domain a sample subset containing the discrete samples corresponding to each desired user data unit according to the discrete signal block assignment of the multiple access technique associated with each desired user data unit;
determining the first part of the multiple access technique associated with each user data unit; and
processing the samples associated with each user data unit according to the associated multiple access technique to permit user data corresponding to each user data unit to be extracted.

15. The method in claim 14, wherein the processed blocks in the group correspond to plural users or to the same user.

16. The method in claim 14, wherein the multiple access techniques include one or more of the following: frequency division multiple access (FDMA) techniques, time division multiple access (TDMA) techniques, and code division multiple access (CDMA) techniques.

17. The method in claim 16, wherein the FDMA techniques include orthogonal frequency division multiplexing (OFDM), orthogonal frequency code division multiplexing (OFCDM), and interleaved-FDMA (IFDMA), and wherein the CDMA techniques include direct sequence (DS)-CDMA and multi-carrier DS-CDMA.

18. The method in claim 14, wherein during the extracting step a cyclic prefix is removed.

19. The method in claim 14, wherein the group of discrete signal blocks corresponds to a time-slot or a packet.

20. The method in claim 14, wherein the transforming of the discrete time samples into frequency domain samples includes performing a discrete Fourier transform (DFT) of appropriate length on a subset of the samples.

21. The method in claim 20, further comprising:
performing an inverse discrete Fourier transform (IDFT) of appropriate length a subset of the frequency domain samples generated by the DFT.

22. The method in claim 14, further comprising:
determining that a condition for the communication has changed, and
registering a change in the multiple access technique associated with one or more of the multiple user data units in response to the changed condition.

23. The method in claim 14, further comprising:
detecting in control information received along with each discrete signal block part or all aspects of the multiple access technique associated with each user data unit, or
detecting in control information transmitted over a signaling channel part or all aspects of the multiple access technique associated with each user data unit.

24. The method in claim 14, further comprising:
blindly detecting part or all aspects of a multiple access technique associated with each user data unit.

25. The method in claim 14, implemented in a radio communications system, further comprising:
wideband filtering the received signal at a radio access stations.

26. The method in claim 14, implemented in a radio communications system, further comprising:
narrowband filtering the received signal at a radio user terminal.

27. Apparatus comprising electronic circuitry configured to:
process each of multiple user data units into discrete samples, user data unit being associated with one of plural different multiple access techniques, where each multiple access technique defines how each of multiple user data units is processed into discrete samples and allocated in a time-frequency plane;
assign the discrete time samples for each user data unit to one or more respective discrete signal blocks; and
group together discrete signal blocks containing discrete samples associated with user data units having different associated multiple access techniques into a time-slot or a packet for transmission over a communications channel.

28. The apparatus in claim 27, wherein the processed user data units in the group correspond to plural users or to the same user.

29. The apparatus in claim 27, wherein the multiple access techniques include one or more of the following: frequency division multiple access (FDMA) techniques, time division multiple access (TDMA) techniques, and code division multiple access (CDMA) techniques, and wherein the FDMA techniques include orthogonal frequency division multiplexing (OFDM), orthogonal frequency code division multiplexing (OFCDM), and interleaved-FDMA (IFDMA), and wherein the CDMA techniques include direct sequence (DS)-CDMA and multi-carrier DS-CDMA.

30. The apparatus in claim 27, further comprising:
a transmitter for transmitting the grouped discrete signal blocks over the communications channel.

31. The apparatus in claim 27, wherein the electronic circuitry is further configured to add a cyclic prefix to the grouped discrete signal blocks before transmission over the communications channel.

32. The apparatus in claim 27, wherein a length of the time-slot or packet is variable.

33. The apparatus in claim 27, wherein the electronic circuitry is further configured to:
process user data units into the frequency domain to generate frequency domain samples;
transform the frequency domain samples into the time domain to generate the discrete time samples.

34. The apparatus in claim 33, wherein the processing of user data units into the frequency domain includes performing a discrete Fourier transform (DFT) of appropriate length on one or more of the user data units, and
wherein the transforming includes performing an inverse discrete Fourier transform (IDFT) of appropriate length of the frequency domain samples.

35. The apparatus in claim 27, wherein the electronic circuitry is further configured to:
determine that a condition for the communication has changed, and
change the multiple access technique associated with one or more of the multiple user data units in response to the changed condition.

36. The apparatus in claim 27, wherein the electronic circuitry is further configured to:
associate each user data unit with a part or all aspects of its associated multiple access technique in control information to be sent along with each discrete signal block; or
associate each user data unit with part or all aspects of its associated multiple access technique in control information to be sent over a signaling channel.

37. The apparatus in claim 27, wherein the apparatus includes a first radio network communications node for communicating over a radio interface with plural access terminals.

38. Apparatus for use in an access terminal associated with a user, the access terminal for communicating with a network node along with other access terminals, the apparatus comprising electronic circuitry configured to:
process one or more user data units into discrete samples, each user data unit being associated with one of plural different multiple access techniques, where each multiple access technique defines how multiple users access a common communications resource;
assign the discrete samples for each user data unit to one or more respective discrete signal blocks; and
transmit the one or more discrete signal blocks over a communications channel using a portion of that channel.

39. The apparatus in claim 38, wherein the electronic circuitry is further configured to:
process the one or more user data units into the frequency domain to generate frequency domain samples; and
transform the frequency domain samples into the time domain to generate the discrete time samples.

40. The apparatus in claim 39, wherein the processing of each of the user data units into the frequency domain includes performing a discrete Fourier transform (DFT) of appropriate length on one or more of the user data units, and
wherein the transforming includes performing an inverse discrete Fourier transform (IDFT) of appropriate length of the frequency domain samples.

41. Apparatus comprising electronic circuitry configured to:
- receive over a communications channel a signal containing signals corresponding to multiple user data units each having a different associated multiple access technique, where each multiple access technique includes a first part that defines how each of multiple user data units is processed into discrete samples and a second part that defines how processed samples corresponding to each of multiple user data units is allocated in a time-frequency plane;
- determine the discrete signal block assignment of the multiple access technique associated with each user data unit;
- according to the determined discrete signal block assignment, extract from the received signal a segment containing the signals corresponding to one or more desired user data units;
- sample the extracted segment to produce a sequence of discrete samples;
- if necessary, transform the discrete samples into frequency domain samples;
- extract from discrete samples in the frequency domain a sample subset containing the discrete samples corresponding to each desired user data unit according to the discrete signal block assignment of the multiple access technique associated with each desired user data unit;
- determine the first part of the multiple access technique associated with each user data unit; and
- process the samples associated with each user data unit according to the associated multiple access technique to permit user data corresponding to each user data unit to be extracted.

42. The apparatus in claim 41, wherein the processed blocks in the group correspond to plural users or to the same user.

43. The apparatus in claim 41, wherein the multiple access techniques include one or more of the following: frequency division multiple access (FDMA) techniques, time division multiple access (TDMA) techniques, and code division multiple access (CDMA) techniques.

44. The apparatus in claim 41, wherein during the extraction, a cyclic prefix is removed.

45. The apparatus in claim 41, wherein the group of discrete signal blocks corresponds to a time-slot or a packet.

46. The apparatus in claim 41, wherein the transforming of the discrete time samples into frequency domain samples includes performing a discrete Fourier transform (DFT) of appropriate length on a subset of the samples.

47. The apparatus in claim 41, wherein the electronic circuitry is further configured to:
- perform an inverse discrete Fourier transform (IDFT) of appropriate length on a subset of the frequency domain samples generated by the DFT.

48. The apparatus in claim 41, wherein the electronic circuitry is further configured to:
- detect in control information received along with each discrete signal block part or all aspects of the multiple access technique associated with each user data unit, or
- detect in control information transmitted over a signaling channel part or all aspects of the multiple access technique associated with each user data unit.

49. The apparatus in claim 41, wherein the electronic circuitry is further configured to blindly detect part or all aspects of a multiple access technique associated with each user data unit.

50. Apparatus, comprising:
- means for processing each of multiple user data units into discrete samples, where each user data unit is associated with one of plural different multiple access techniques, where each multiple access technique defines how each of multiple user data units is processed into discrete samples and allocated in a time-frequency plane;
- means for assigning the discrete samples for each user data unit to one or more respective discrete signal blocks;
- means for grouping together discrete signal blocks containing multiple user data units having different associated multiple access techniques for transmission over a communications channel,
- means for processing user data units into the frequency domain to generate frequency domain samples; and
- means for transforming the frequency domain samples into the time domain to generate the discrete time samples,
- wherein the means for processing user data units into the frequency domain includes means for performing a discrete Fourier transform (DFT) of appropriate length on one or more of the user data units, and
- wherein the means for transforming includes means for performing an inverse discrete Fourier transform (IDFT) of appropriate length of the frequency domain samples.

51. The apparatus in claim 50, further comprising:
- means for adding a cyclic prefix to the discrete samples assigned to each discrete signal block.

* * * * *